UNITED STATES PATENT OFFICE.

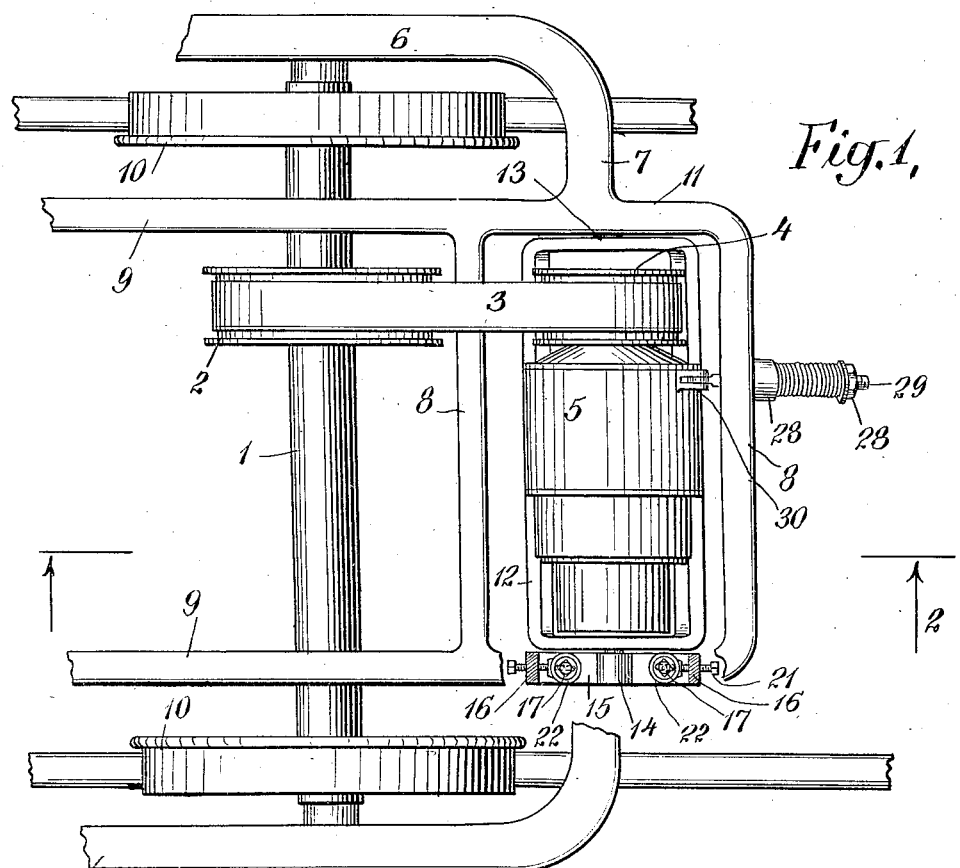
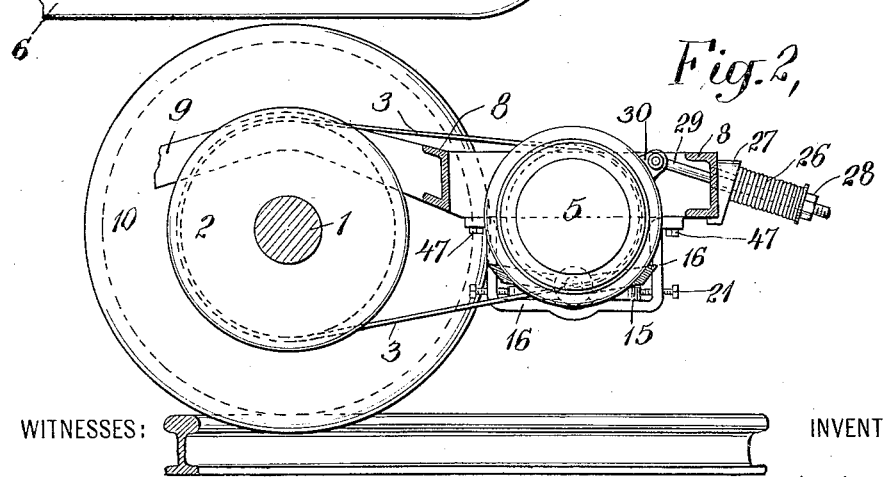

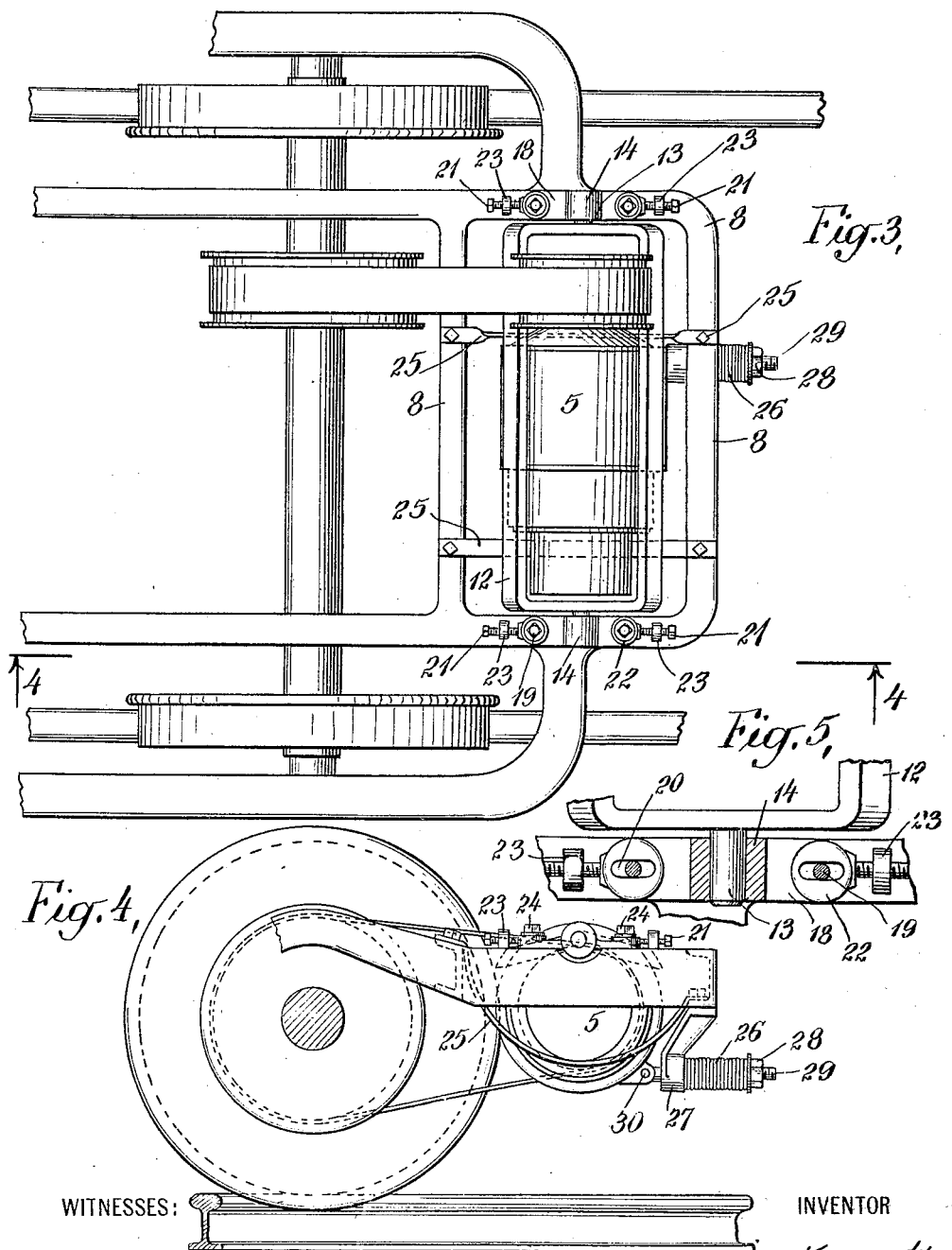

PATRICK KENNEDY, OF NEW YORK, N. Y., ASSIGNOR TO CONSOLIDATED RAILWAY ELECTRIC LIGHTING AND EQUIPMENT COMPANY, OF NEW YORK, N. Y., A CORPORATION OF MAINE.

TRUCK CONSTRUCTION FOR DYNAMO SUSPENSION.

1,049,104.      Specification of Letters Patent.      Patented Dec. 31, 1912.

Application filed May 17, 1911. Serial No. 627,773.

*To all whom it may concern:*

Be it known that I, PATRICK KENNEDY, a citizen of the United States, residing at No. 177 Putnam avenue, borough of Brooklyn, county of Kings, city and State of New York, have invented certain new and useful Improvements in Truck Construction for Dynamo Suspension; and I do hereby declare the following to be a full, clear, and exact description of the invention, such as will enable others skilled in the art to which is appertains to make and use the same.

This invention relates to truck constructions for dynamo suspensions and particularly to a form adapted to suspend within the truck frame an axle driven car lighting generator or an electric motor adapted to drive the axle.

In my co-pending application, Serial No. 627,772, filed of even date herewith, I have broadly disclosed a truck having a divided end-sill together with a form of suspension supported from the side members thereof.

The object of this invention is to provide means for supporting a dynamo from the end members of the divided end-sill in such a way that the axis of the suspension is substantially parallel to the axle of the truck, and the dynamo is suspended well above the track rails.

Another object is to provide, in combination with such a form of truck and suspension, means for adjusting at will either or both of the points of support to adjust the degree of parallelism between the dynamo shaft and the axle, and also to adjust the interaxial distance between them.

Another object is to provide means for automatically regulating the belt tension by turning the dynamo about the pivot points of support in such manner as to effect the distance between the driving and driven members.

In the accompanying drawings showing the preferred embodiment of this invention, Figure 1 is a plan view, partly broken away, of a truck showing a dynamo embraced by the end-sill; Fig. 2 is a side elevation on section line 2—2 of Fig. 1; Fig. 3 is a plan view of a truck showing a modified form of suspension; Fig. 4 is a side elevation on section line 4—4 of Fig. 3; Fig. 5 is a detail view of the suspension bearing in the end-sill.

The car axle 1 is journaled in the truck in any well known way (not shown) and carries a pulley 2 adapted, by means of a belt 3 and pulley 4 to drive, or to be driven by, a dynamo 5, depending upon whether a car lighting generator is driven from the axle to supply electric current, or whether an electric motor is supplied with current to drive the car.

Excepting the end-sills, the truck may be of any ordinary construction, having the side-sills 6. The end-sill comprises the two connecting members 7 projecting from the side frames, and an intermediate part divided horizontally into two transverse side members 8, thereby forming a space between the side members adapted to embrace the dynamo. In this way the dynamo may be supported so that its center line lies substantially in line with the members 7, which is the position occupied by the end-sill of types of construction heretofore customary. Furthermore, if desired, the center line of the dynamo may be located substantially in the same horizontal plane as the center line of the axle, so as to secure ample clearance between the bottom of the equipment and the top of the track rails.

In the drawings I show an end-sill integral with the side frames, and with the ends merging thereinto in a curved outline, in order to obtain strength with an economical use of material. The truck members and the end-sill may be constructed of any suitable material and with any suitable section, although it is preferable to use cast or pressed steel having a channel or angle shape. Although it is not essential, the trucks shown are provided with longitudinal safety-bars 9, between the wheels 10, the extension of these members forming the end members 11, of the end-sills.

The side members 8 of the end-sill may be bolted or otherwise fastened to the end members 11, or may be made integral therewith as shown in the drawings. Also the side members may be formed square with the end members or they may merge thereinto to form curved ends. Various other modifications of the form of the end-sill in connection with the side-sills may be used in combination with the form of suspension herein disclosed, the only essential condition being that the end-sill be horizontally divided so as to embrace a dynamo between the members thereof.

The suspension for the dynamo may have various forms, but, in this case, I prefer to provide a suspension which comprises a frame such as 12 pivotally supported in the end members 11 by the trunnions 13. In Fig. 1 the trunnions are journaled in bearings 14, carried by pedestals 15 supported by the bent straps 16 which are fastened to the bottom of the end members of the end-sill by any suitable means such as bolts 47. The pedestals are adjustably fastened to the straps 16 by the bolts 17 threaded into the straps and passing through the elongated holes 20 in the bed plate. In Fig. 3 the trunnion bearings 14 are supported on the top of the end-members 11 by the pedestals 18 which are fastened by bolts 19 threaded into the end-sill and passing through the elongated holes 20 in the pedestals, as is best shown in Fig. 5. With these forms of construction, the degree of parallelism between the center line of the dynamo and the axle 1, and the interaxial distance between them, may be adjusted at will by means of the adjusting bolts 21, which are threaded through the bent straps 16 in Fig. 1 and through the lugs 23 carried by the end-sill in Fig. 3, to co-act with the bosses 22 having elongated holes 20.

In Fig. 1, the dynamo rests directly in the frame or cradle 12, while in Fig. 3 the dynamo is supported from the frame or cradle 12 by means of the bolts 24 and further supported by means of the safety straps 25 which are fastened to the side members 8 of the end-sill by bolts or in other suitable manner. The belt tension may be automatically regulated by a spring between the truck and any part arranged to swing about the trunnions. For this purpose I show the spring 26 pressing against the member 27 fixed to the truck and against the nut 28 which is threaded on a rod 29 connected to the dynamo at 30. The compressive stress of the spring may be adjusted by means of the nut 29 to suit the particular conditions of operation.

It is apparent that the construction herein disclosed may be modified in many particulars without departing from the spirit of the invention and, therefore, I do not in any way limit myself to the specific form shown. The essential features of the invention are a divided end-sill integral with the side-sills and a suspension supported from the end members 11 of the end-sill.

In this application the claims for the truck are limited to a structure in which the end-sill is integral with the side-sills, while the claims for the dynamo suspension are limited to trunnion bearings therefor, or a suspension supported from the end members of the truck. The companion application 627,772, filed May 17, 1911, broadly covers a truck having a divided part adapted to embrace a dynamo, and specifically a structure in which the end-sill is fastened to the side-sills, while the claims for the dynamo suspension broadly cover a dynamo mounted between the members of the end-sill, and specifically a cradle hung between the sides of the end-sill.

Having thus described my invention what I claim is:

1. A car truck having side-sills and an end-sill integral with said side-sills and having an intermediate divided part adapted to embrace a dynamo between the members thereof.

2. A car truck having side-sills and an end-sill integral with said side-sills and merged thereinto in a curved outline, said end-sill having an intermediate divided part adapted to embrace a dynamo between the members thereof.

3. The combination with a truck having a divided end-sill, of a dynamo suspension supported on trunnions from the members thereof.

4. The combination with a truck having a divided end-sill, of a dynamo suspension supported from the end members and between the side members thereof.

5. The combination with an axle, and a truck having a divided end-sill, of a dynamo suspended from the end members thereof and operatively connected with the axle by a belt, and means for varying the distance between the dynamo and axle, whereby the tension of the belt is adjusted.

6. The combination with an axle, and a truck having a divided end-sill, of a dynamo suspended from the end members thereof and operatively connected with the axle by a belt and means for adjusting at will the points of suspension to vary the distance between the dynamo and the axle, whereby the belt is tightened or loosened at will.

7. The combination with an axle, and a truck having a divided end-sill, of a dynamo pivotally suspended from the end-members and between the side members thereof and operatively connected with the axle by a belt, and automatic means adapted to swing the dynamo about the pivots whereby the tension of the belt is automatically regulated.

8. The combination with an axle, and a truck having a divided end-sill, of a dynamo pivotally suspended from the end members and between the side members thereof and operatively connected with the axle by a belt, means for adjusting at will the distance between the dynamo and axle whereby the belt is loosened or tightened, and means for automatically swinging the dynamo about its pivots whereby the belt tension is regulated.

9. The combination with an axle, and a truck having a divided end-sill, of a frame supported in slidable bearings from the end members thereof, a dynamo supported by said frame and operatively connected with the axle by a belt, and means adapted to move said bearings toward or away from the axle, whereby the belt is loosened or tightened.

10. The combination with an axle and a truck having a divided end-sill, of a frame pivotally supported in slidable bearings in the end members thereof, a dynamo supported from said frame and operatively connected with the axle by a belt, means for moving said bearings toward or away from the axle whereby the belt may be loosened or tightened at will, and a spring acting against the dynamo or frame and a fixed part of the truck to swing the frame in its bearings whereby the belt tension is automatically regulated.

In testimony whereof I affix my signature, in presence of two witnesses.

PATRICK KENNEDY.

Witnesses:
   Aug. Treadwell, Jr.,
   Mrs. Edwin French.

Copies of this patent may be obtained for five cents each, by addressing the "Commissioner of Patents, Washington, D. C."